United States Patent [19]

Sellke

[11] Patent Number: 5,218,501
[45] Date of Patent: Jun. 8, 1993

[54] DEVICE FOR ALIGNING MAGNETIC TAPE TO A READ-WRITE HEAD

[75] Inventor: Richard G. Sellke, Hillsboro, Oreg.

[73] Assignee: Archive Corporation, Costa Mesa, Calif.

[21] Appl. No.: 691,760

[22] Filed: Apr. 26, 1991

[51] Int. Cl.$^5$ .............................................. G11B 15/60
[52] U.S. Cl. .............................................. 360/130.21
[58] Field of Search ............... 360/130.21, 130.22, 360/130.23, 130.24, 85, 95

[56] References Cited

U.S. PATENT DOCUMENTS 4,786,011 11/1988 Fujiwara et al. ............... 360/130.21

FOREIGN PATENT DOCUMENTS 0038906 3/1977 Japan ............................. 360/130.24
0259254 11/1987 Japan ............................. 360/130.24

Primary Examiner—A. J. Heinz
Attorney, Agent, or Firm—Eugene H. Valet

[57] ABSTRACT

A tape guide device adapted for a magnetic tape transport system is disclosed. A biasable flat spring, mounted on a barrel roller mechanism, frictionally engages the top edge of magnetic tape. The spring is mounted in order to allow simple adjustment of both the force applied to the top edge of the magnetic tape and the contact angle between the tape and the spring at the arc-radius of the barrel roller.

8 Claims, 4 Drawing Sheets

DEVICE FOR ALIGNING MAGNETIC TAPE TO A READ-WRITE HEAD

BACKGROUND OF THE INVENTION

1. Field of the Invention

The present invention relates generally to magnetic information storage and retrieval, more particularly to magnetic tape storage devices and components, and specifically to a tape guide for magnetic tape as exemplified for use in a computer backup tape transport subsystem.

2. Description of the Related Art

Despite the advent and popularity of magnetic tape cartridges having an integral tape supply connected to both supply and a take-up reels, applications remain in which loose-ended, ¼-inch wide, magnetic tape is used. Such magnetic tape finds applications in both the audio recording and computer industries, such as in a data cartridge form as defined by American National Standard (ANSI) X3.180-1990. More specifically, this cartridge has a single supply reel of magnetic tape that has a tape leader block attached to the free end of the tape. The tape is loaded from the cartridge to a take-up hub in the tape transport system (interchangeably referred to as a "drive") by extracting the leader block and threading the tape passed a read/write transducer (the transducer subassembly is also referred to as a "head"). The Cipher Data Products, Inc. model 3000i drive and TapeXpress drive ("TapeXpress" and the "3000i" logo are trademarks of Cipher Data Products) and the IBM model 3480 tape drive ("IBM" is a registered trademark of International Business Machines Company) utilize this cartridge.

Drives designed specifically for a such a tape cartridge are described in U.S. Pat. Nos. 4,704,645, 4,809,099 and 4,852,825 to the common assignee of the present invention, incorporated herein by reference.

As shown in FIG. 1 (Prior Art), it is known to thread magnetic tape 2 passed a magnetic head 4 that includes at least one read/write transducer subsystem. In the tape path, tape guides 6, 8 are mounted on a deck plate 9 that is typically part of the frame of the drive. These guides 6, 8 are appropriately positioned with respect to the head 4 in order to assure a proper attack angle and alignment of the tape 2 with read/write gaps 10, 12 in the head 4. To improve alignment between the tape and head and tape travel stability over the head 4, more guides (not shown) are often added between the supply and take-up reels.

The tape 2 in such a drive is used, for example by IBM, specifically to write eighteen tracks in parallel. The head 4 has one common write gap line and one common read gap line with eighteen individual read or write coils per track. Other transports using this same cartridge, such as the 3000i drive, have been designed to record up to twenty-four parallel tracks recorded in a serpentine fashion (also known as "streamer" tape drives), using a single head that is stepped to an addressed track. Track position is determined by the tape guides while track width is controlled by the core dimensions of the head. Since it is known to have the track width between 0.017 and 0.021 inch in such drives, it is of extreme importance that the tape be consistently guided passed the read/write gaps 10, 12 in head 4. Accurate alignment is critical to repeatable read/write functionality.

In the prior art, it is known to use a static, non-rotating guide mechanism 6 as a tape guide bearing, having ceramic flange members 14, 16 on the top and bottom of a guide 18 against which the tape 2 is drawn by motors coupled to supply and take-up reels (not shown). [It will be recognized by a person skilled in the art that a tape drive may be installed internally to a computer, rack mounted, or be a freestanding computer peripheral. Hence, while the common terms "top" and "bottom" are used herein for convenience of explanation and clarity, it should be understood that such terms are not to be construed as limitations; for example, a freestanding computer peripheral could be used in a stand which actually operates the drive while standing on its edge.] These full flanges 14, 16, or ceramic tipped springs, are used to provide an edge force on the upper edge 26 of the magnetic tape 2 in order to position the tape against a reference surface with respect to the head gaps 10, 12. In some such devices, air pressure, applied by an internal compressor or pump, is used with this type of static guide mechanism 6 to minimize tape frictional drag and to prevent the type from sticking to the generally smooth surface of the guide 18.

Also shown in FIG. 1, another method known in the art uses a conical spring 20 on top of a ceramic flange member 14' that covers the top of a static or roller-type barrel 22 in order to provide an appropriate edge force to the edge of tape 2. However, it has been found that this type of spring 20 generally provides an unbalanced force to the tape 2. Too high a pressure can damage the tape and too low a pressure allows the tape to wander across the face of the head, misaligning tracks with respect to the read/write gaps 10, 12. Additionally, stiction can still occur between the abutting, recorded surface of the tape 2 and roller barrel 32 unless an air bearing system is again used.

The expensive, ceramic flanges 14, 14' used to "squeeze" the tape 2 have also been found to turn during tape motion if mounted on a circular rod or to bind on a non-circular mounting post 18 or roller 22. This effect can damage also the tape 2.

Moreover, operative parts of the nature of the prior art are generally comparatively large when compared to the new, smaller tape paths such as may be found in use with a desktop, personal computer where the tape drive may have to be configured to fit into the same form factor as a floppy disk drive.

Thus, there is a need for an improved, inexpensive tape guide device for use in threaded magnetic tape transport systems.

SUMMARY OF THE INVENTION

It is an object of the present invention to provide a device for accurately guiding magnetic tape across the read/write head of a tape drive.

It is an advantage of the present invention that it provides a substantially constant force on an edge of moving magnetic tape.

It is an advantage of the present invention that it provides a magnetic tape guide with a pre-determined edge force on the upper edge of tape.

It is yet another advantage of the present invention that it eliminates a relatively expensive ceramic part of the prior art while improving performance.

It is a further advantage of the present invention that it provides for simple adjustment to the force applied to an edge of a magnetic tape moving through a tape guide device.

It is still another advantage of the present invention that it uses a simple cantilever with no bends, eliminating close tolerance manufacturing requirements.

In its basic aspect, a tape guide device mounted in a transport apparatus for magnetic recording tape, having a support for the flat surface of said tape; an abutting member connected to an external bottom area of said support for frictionally engaging the bottom edge of said tape; a biasable member for abutting the top edge of said tape; and a mount, connected to an external top area of said supporting means, for mounting said biasable member in a predetermined bias for frictional engagement of the top edge of said tape.

Other objects, features and advantages of the present invention will become apparent upon consideration of the following detailed description and the accompanying drawings, in which like reference designations represent like features throughout the Figures.

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable. While these embodiments are exemplified as used in a tape drive for use in computer data storage and retrieval, it will be recognized by persons skilled in the art that the invention is equally applicable to magnetic tape transport systems for other applications where very accurate tape guiding is needed, such as digital audio recording.

Figure 1:
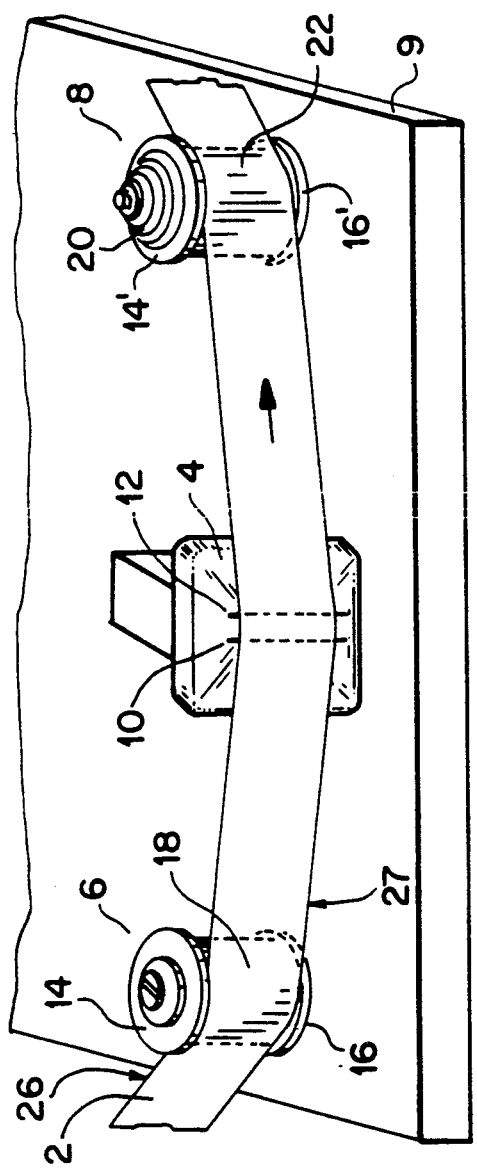
FIG. 1 is a simplified, perspective view schematic drawing of prior art magnetic tape guide devices.
Figure 2:
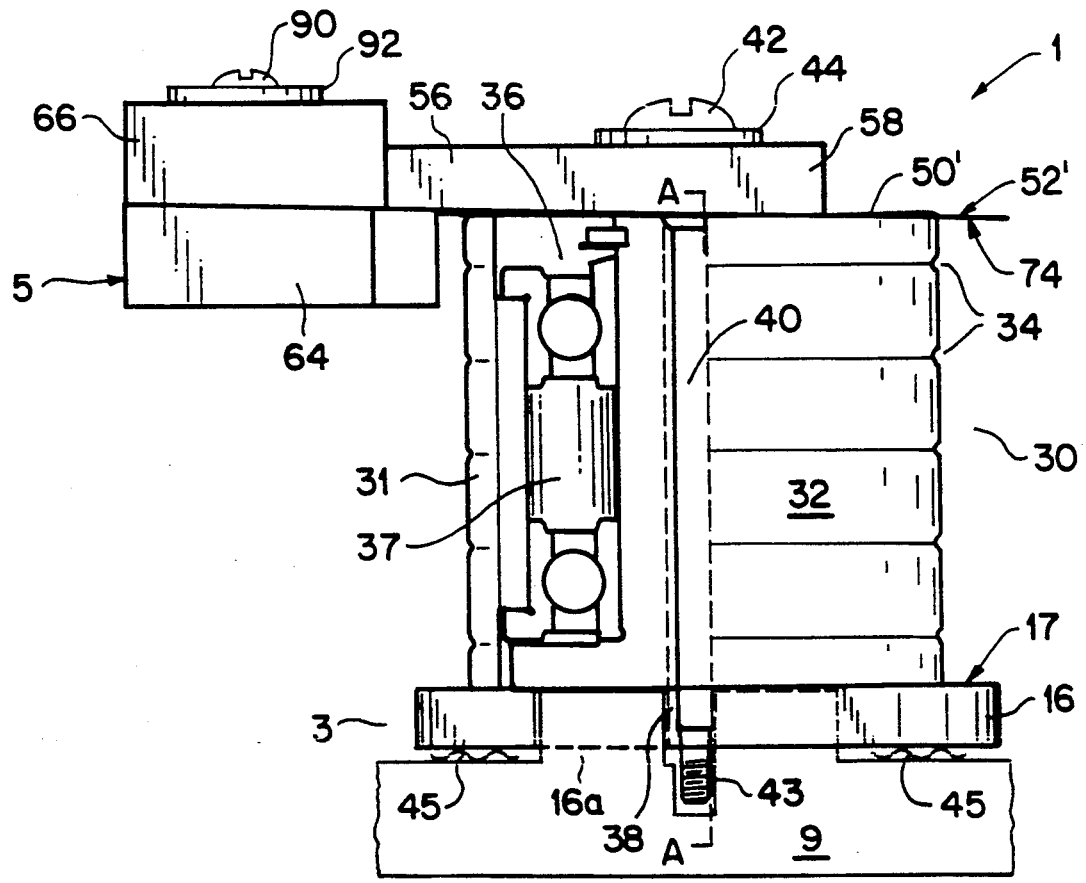
FIG. 2 is a partial cut-away, plan view (side) of a magnetic tape guide device in accordance with the present invention.

Referring to FIG. 2, a tape guide device 1 of the present invention is shown. A tape support base member 3 (analogous to those shown in FIG. 1 as members 16, 16') comprises a lower flange member 16 in the general nature of a ceramic washer. This tape support base member 3 also supports a common barrel roller assembly 30 as is known in the prior art, used as a lower tape guide. This support is provided by having a central aperture 16a with a diameter which is less than the diameter of the barrel roller assembly 30 and having an outer diameter which is greater than the diameter of the barrel roller 31. By having said outer diameter of the tape support base member 3 greater than the diameter of the barrel roller 31, a ceramic upper surface 17 of the tape support base member 3 is used to guide, support and bias the edge of a magnetic tape (not shown) drawn across the guide device 1.

While the surface 32 of the guide barrel roller 31 which will interface with the flat surface of the magnetic tape may comprise a smooth surface, it has been found that scoring the surface 32 with concentric circle indentations 34 improves performance. In operation, such indentations 34 prevent an air bearing from lifting the moving tape away from the barrel surface 32 which would affect the interface between the tape recording surface and the transducer gaps. The core 36 of the barrel assembly 30 comprises a common roller bearing assembly 37 which allows the barrel 31 to rotate freely about said core 36 as will be familiar to those skilled in the art. The core 36 also includes a through-hole shaft 38 for receiving a fastening bolt 40 having a threaded end 43 used to secure the device 1 to the frame 9 of the tape drive in which the device 1 is installed in a similar configuration to the Prior Art devices shown in FIG. 1. Wave springs 45 are positioned between the frame 9 upper surface and the lower flange 16.

Figure 4:
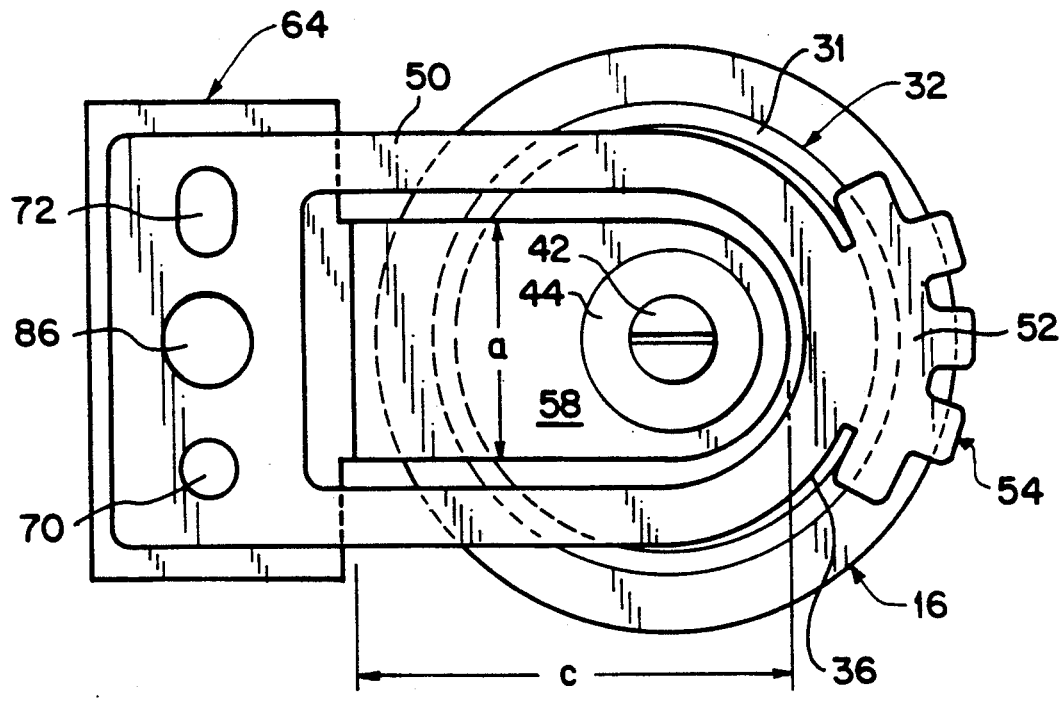
FIG. 4 is a plan view (top) of the magnetic tape guide device in accordance with the present invention as shown in FIG. 2 with an alternate embodiment of the spring member as shown in FIG. 5.

A spring and mounting block assembly 5 is affixed to the upper region of guide barrel assembly 30 by bolt 40 having a slotted head 42 and optional washer 44. In order to prevent interference between the rotating barrel 31 and the spring and mounting block assembly 5, the barrel roller assembly is provided with an annular center post (not shown) surrounding said through-hole shaft 38, which raises assembly 30 arm portion 58 to provide a minimal clearance above the edge of the barrel roller 31 at areas where they are adjacent as shown in FIG. 4 (hidden line depiction).

Figure 3:
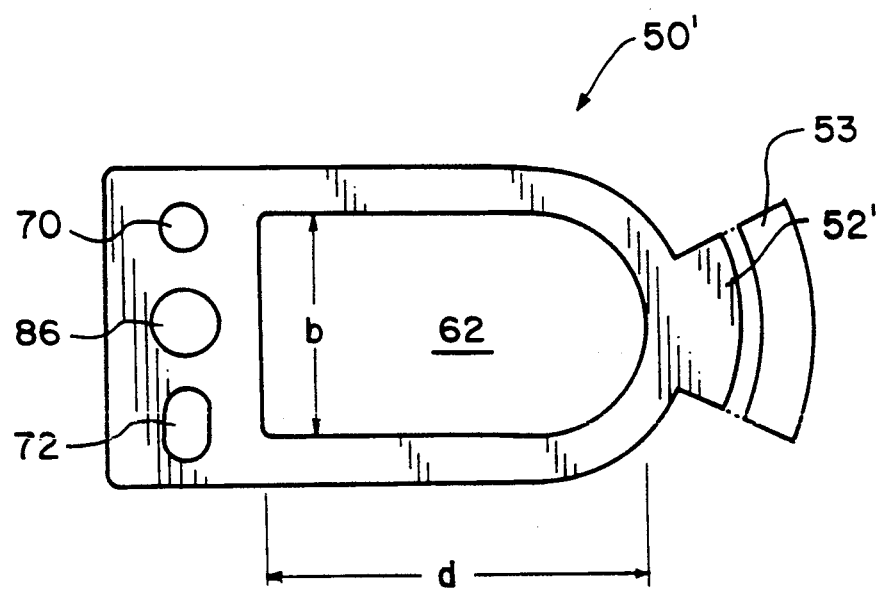
FIG. 3 is an exploded plan view (top) of a spring member of the magnetic tape guide device, showing an optional ceramic tip, in accordance with the present invention as shown in FIG. 2.
Figure 6:
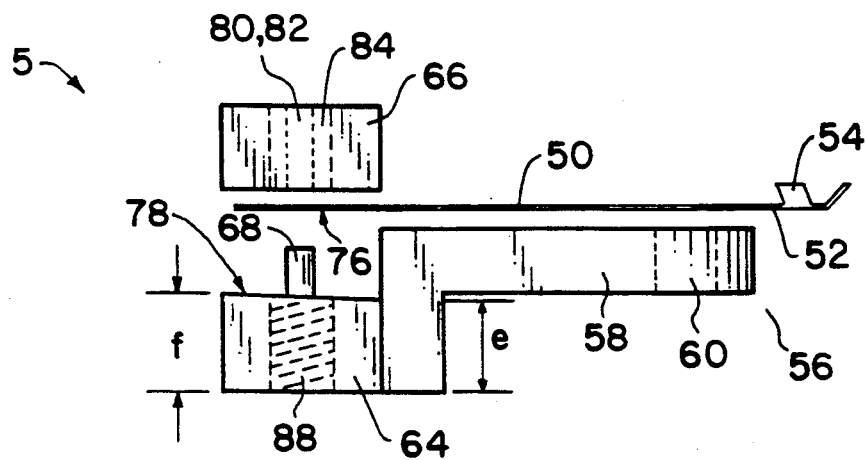
FIG. 6 is an exploded, side view of a mounting block of the magnetic tape guide device in accordance with the present invention using the spring member as shown in FIG. 5.
Figure 5:
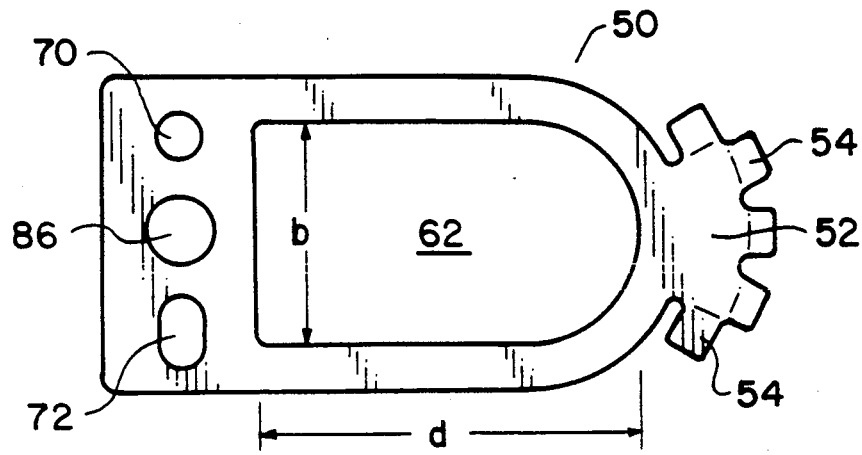
FIG. 5 is a plan view (top) of an alternative embodiment of the spring member of the present invention as shown in FIG. 3.

Referring now to FIGS. 3, 5 and 6, it can be seen that a two-piece mounting assembly 5 is used to sandwich a flat spring 50, 50' (also known as a "leaf spring") into a cantilever beam configuration. A flange portion 52, 52' of said spring 50, 50' overhangs the surface 32 of roller barrel assembly 30 in the same manner and approximately the same radial distance as lower flange 16 of tape support base member 3. This spring 50, 50' is used to bias or force the tape downwardly against the ceramic reference 17 surface of the lower flange 16. The load bearing portion of the spring 52 is purposely left flat.

While a spring 50' having a simple flat portion 52 as shown in FIG. 3 is acceptable when provided with a ceramic tip 53, it has been found that it is preferable to provide a flange 52 with upwardly inclined tabs 54 beyond the load bearing flat. These end tabs 54 provide an open lead-in for the magnetic tape being drawn passed the guide device 1 by the transport mechanism during tape loading. Additionally, it has been found that the bottom surface 74 of the spring 50' may ride on the top edge of the barrel roller 31 without significantly affecting operation due to low frictional force between the two. A low friction coating, such as Teflon (trademark), may be used to substantially eliminate all such friction between the spring 50' and barrel roller 31.

Referring now to FIG. 6, a first embodiment of the spring and mounting block assembly 5 is shown to comprise a leaf spring 50 and two block segments 56, 66. The lower block segment 56 comprises an arm portion 58 having a through-hole shaft 60 for receiving and passing mounting bolt 40 (FIG. 2). Referring briefly to FIGS. 4 and 5, it will be noted that arm portion 58 has a crosswise dimension a which is less than leaf spring aperture 62 cross-dimension b and a lengthwise dimension c that is less than lengthwise dimension d of aperture 62, allowing spring 50 to be captured by insertion of said arm portion 58 through said aperture 62. Returning to FIG. 6, the lower block 56 further comprises a spring mounting portion 64. The mounting block portion 64 is provided with two pins or integral posts 68 in alignment with apertures 70, 72 in the spring 50. In practice, lower block 56 can be a one-piece, machined or die cast, aluminum part or a molded plastic part.

Referring briefly to FIG. 2, it will be recognized that the lower surface 74 of spring flange 52 will exert a generally downward force on an upper edge of the magnetic tape (not shown) loaded to have its flat surface against barrel surface 32. In fact, it has been found that it is preferable to have the distance between spring surface 74 and ceramic flange surface 17 to be less than the width of the loaded magnetic tape. For example, the above-reference specification for the 3480 cartridge tape is 0.498±0.001 inch. In the preferred embodiment, the barrel roller 32 has a height of approximately 0.494 inch. This will ensure spring contact with the edge of tape at all times.

Using common engineering practices, the flat spring 50, 50' should be designed of sufficient thickness to provide a predetermined edge force on the top edge of tape. The force to the edge of tape is controlled by specifying the angle of the spring mounting face 76 on the contacting surface 78 of portion 64 of lower block 56. As shown in FIG. 6, this angle is determined by making dimension e less than dimension f. For example, in a preferred adaptation of this embodiment, an angle in the range of 1.25 to 3.00 degrees is specified. It will be recognized, however, that the force is a function of both the angle and the spring thickness; therefore, any combination may be designed to achieve a specific desired force to the edge of tape.

Holding block 66 of mounting block assembly 5 is provided with shafts (or through-holes) 80, 82 in alignment with the leaf spring 50 apertures 70 and 72 and pins 68 of lower block 56. Additionally, a through-hole shaft 84 in alignment with aperture 86 of leaf spring 50 and threaded bore 88 allows holding block 66 to bond the mounting block assembly with the spring 50 fixed as shown in FIG. 2 via a common bolt 90 and optional washer 92.

Figure 7:
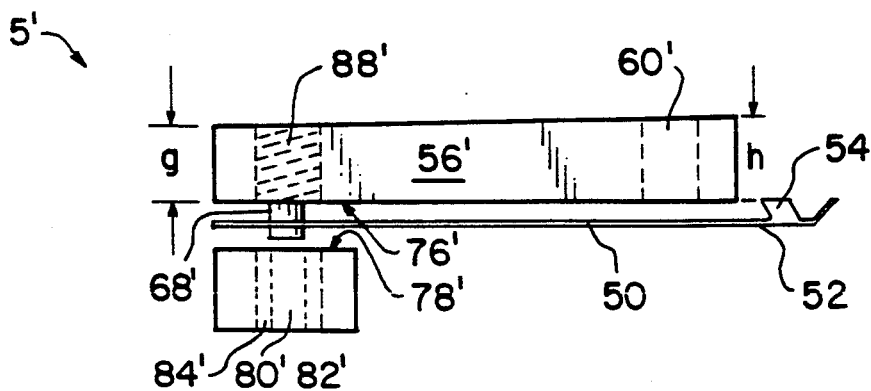
FIG. 7 is an exploded, side view of an alternative embodiment of a mounting block of the magnetic tape guide in accordance with the present invention using the spring member as shown in FIG. 5.

An alternate, preferred embodiment of a spring and mounting block assembly 5' is shown in FIG. 7. In this simplified version, the mounting block segment 56' has become the upper block segment of the assembly 5' relative to the top of barrel roller assembly 30 (and ultimately the tape drive frame to which it is similarly mounted via a bolt through-hole shaft 60' in a manner substantially identical to that described for the previous embodiment). The spring holding block 66' has become an inverted lower block in comparison to FIG. 6, but generally attaches to the upper block 56' and spring 50 in the same manner. In this configuration, the force to the edge of tape via spring surface 74 of flange 52 is controlled by specifying the angle of the spring mounting face 76' on the contacting surface 78' of mounting block 56' with respect to holding block 66' by making the dimension g less than the dimension h.

Because of the use of flat springs 50, 50', it will be recognized by those skilled in the art that more than one spring may be stacked or sandwiched together in order to proved additional stiffness and, therefore, a stronger and more constant pressure on the upper edge of the tape as it passes through the guide device 1. Because of the spring end tabs 54, it is preferable to use a spring of the configuration of FIG. 5 with one or more spring as shown in FIG. 3, without the ceramic tip 53, overlying the tabbed spring to facilitate tape loading and to prevent damage to the tape.

Additionally, although the expense would be increased, it is contemplated that flange 52, 52' of the spring 50, 50' may also be ceramic coated. This will not only help protect the spring metal from damage which can be caused by the moving tape edge, but also has been found to damp vibrations in the cantilevered spring, thereby providing an even more uniform pressure on the tape edge and hence a more accurate tape guide effect.

As mentioned earlier, an advantage of the present invention lies in simplicity of adjustment. In addition to the adjustment of force on the edge of the tape via the use of additional springs to the spring and mounting block assembly 5, it has been mentioned that the nature of the mounting relationship to the barrel roller mechanism 30, and ultimately to the drive frame, is facilitated by the use of a common bolt 40 fastener. It has been found that a substantially more uniform force is applied to the edge of tape by the spring 50, 50' along the arc-radius of curvature as the tape moves across the barrel roller surface 32 rather than at a tangent point. At the tangent point the flat web of tape tends to buckle. Therefore, the relationship between the lower surface 74 of the spring flange 52, 52' is important. This can be simply adjusted and the contact brought inside the tangent by merely loosening the bolt 40 to perform the proper alignment.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A tape guide device mounted in a transport apparatus for ribbon-type magnetic recording tape having a tape flat surface width dimension that is substantially constant over the entire tape length, comprising:
   a barrel roller mechanism having a barrel roller with a height dimension which is less than said width dimension of said tape flat surface for supporting said flat surface of said tape;
   means, connected to an external bottom area of said barrel roller, for abuttingly frictionally engaging a bottom edge of said tape; and biasable means, connected to an external top area of said barrel roller, for abuttingly frictionally engaging a top edge of said tape, wherein said biasable means provides a predetermined bias force on said top edge of said tape.

2. In a magnetic tape recording and playing apparatus having a magnetic head subsystem for writing information on and reading information from a ribbon-type magnetic tape, having a recording surface and a backing surface of a substantially constant height dimension, and a mechanism for loading a loose end of tape from a supply reel of tape to a takeup reel in said apparatus, a device mounted to guide said tape across said head, comprising:

a barrel roller subsystem, mounted in said apparatus, having a barrel roller with a first diameter, for bearing a surface of said tape on a segment of the circumference of said barrel roller, wherein said barrel roller has a height dimension which is less than said height dimension of said tape surface;

a ceramic washer, mounted to said barrel roller and forming a flange for slidably engaging a first edge of said tape by having a diameter greater than said first diameter; and at least one flat spring, mounted to a distal end of said barrel roller from said ceramic washer, overhanging said barrel roller and forming thereby a second flange for slidably engaging a second edge of said tape, said spring being mounted on a cantilever beam adapted to provide adjustable pressure force to said second edge of said tape, opposing a pressure force toward said spring imposed on said first edge of said tape by said ceramic washer flange, whereby said spring provides a predetermined bias force on said tape to maintain accurate alignment with said head.

3. The device as set forth in claim 2, wherein said cantilever beam is adjustable to change the radial angle at which said spring engages said second edge along said circumference of said barrel roller.

4. The device as set forth in claim 3, wherein said angle is set to have said tape abut said spring means at an arc radius of curvature of said barrel roller.

5. The device as set forth in claim 3, wherein said spring has two or more tab extensions from said overhang that are bent at an angle obtusely from the surface of said barrel roller, whereby loading of said tape is facilitated.

6. In a computer magnetic tape drive having a frame, a head having read and write gaps therein mounted to said frame, a portion of said drive adapted to receive at least part of a cartridge having an extensible and retractable supply of ribbon-type magnetic recording tape with a leader block attached to a loose end of said tape, a subsystem for transporting said leader block and extending said tape passed said head during cartridge loading and unloading, a takeup reel adapted to receive said leader block, motors adapted to drive said reels, and a controller and interface between said drive and a computer, an improved device for aligning said tape with said gaps, at least one said device being mounted on said frame on each side of said head, characterized by:

a barrel roller mechanism, having a barrel roller having a first diameter with a circumferential surface adapted to bear a recording surface of said tape;

a flange member, mounted abuttingly with a first edge of said barrel roller and having a second diameter greater than said first diameter such that a first edge of said tape when loaded frictionally engages said flange;

a mounting block assembly, mounted adjacently to a second edge of said barrel roller distal from said first edge; and at least one flat spring, attached to said mounting block assembly, mounted between said mounting block assembly and said distal edge of said barrel roller such that a surface of said spring rides on said distal edge, and having a flat portion of said spring overhanging said circumferential surface of said barrel roller such that said flat portion frictionally engages a second edge of said tape distal from said first edge, wherein said mounting block assembly and spring form an adjustable cantilever adapted to apply a predetermined edge force to said tape.

7. The device as set forth in claim 6, wherein said spring flat portion has two or more tab extensions that are bent at an obtuse angle from the surface of said barrel roller such that loading of said tape is facilitated.

8. The device as set forth in claim 7, wherein said adjustable cantilever is adapted to adjust the position on said circumferential surface of said barrel roller where said edge force is applied to said tape.

* * * * *

UNITED STATES PATENT AND TRADEMARK OFFICE
CERTIFICATE OF CORRECTION

PATENT NO. : 5,218,501

DATED : June 8, 1993

INVENTOR(S) : Sellke

It is certified that error appears in the above-identified patent and that said Letters Patent is hereby corrected as shown below:

Column 2, line 22, please delete "type" and insert therefor --tape--

Column 1, line 28, please delete "passed" and insert therefor --past--

Column 1, line 36, please delete "a" after the word "for"

Column 1, line 41, please delete "passed" and insert therefor --past--

Column 1, line 66, please delete "passed" and insert therefor --past--

Column 4, line 59, please delete "passed" and insert therefor --past--

Column 5, line 26, please delete "reference" and insert therefor --referenced--

UNITED STATES PATENT AND TRADEMARK OFFICE
CERTIFICATE OF CORRECTION

PATENT NO. : 5,218,501

DATED : June 8, 1993

INVENTOR(S) : Sellke

It is certified that error appears in the above-identified patent and that said Letters Patent is hereby corrected as shown below:

Column 6, line 6, please delete "proved" and insert therefore --provide--

Claim 6, column 8, line 10, please delete "passed" and insert therefor --past--

Signed and Sealed this

Nineteenth Day of April, 1994

Attest:

BRUCE LEHMAN

Attesting Officer

Commissioner of Patents and Trademarks